(12) United States Patent
Kakeya

(10) Patent No.: US 6,614,426 B1
(45) Date of Patent: Sep. 2, 2003

(54) METHOD AND DEVICE FOR DISPLAYING SIMULATED 3D SPACE AS AN IMAGE

(75) Inventor: Hideki Kakeya, Tokyo (JP)

(73) Assignee: Communications Research Laboratory, Independent Administrative Institution, Tokyo (JP)

( * ) Notice: Subject to any disclaimer, the term of this patent is extended or adjusted under 35 U.S.C. 154(b) by 0 days.

(21) Appl. No.: 09/363,405

(22) Filed: Jul. 29, 1999

(30) Foreign Application Priority Data

Jul. 30, 1998 (JP) .......................................... 10-229329

(51) Int. Cl.7 .............................................. G06T 15/00
(52) U.S. Cl. ............................. 345/419; 359/466; 353/7
(58) Field of Search ............................. 348/42; 345/419, 345/7–9; 359/466, 472, 477, 479; 353/7, 10

(56) References Cited

U.S. PATENT DOCUMENTS 4,772,094 A * 9/1988 Sheiman ...................... 359/472

5,896,226 A * 4/1999 Peuchot et al. .............. 359/472

FOREIGN PATENT DOCUMENTS

| JP | 5-103351 | 4/1993 |
| JP | 8-179259 | 7/1996 |

* cited by examiner

Primary Examiner—Mano Padmanabhan
Assistant Examiner—Lance W. Sealey
(74) Attorney, Agent, or Firm—Oblon, Spivak, McClelland, Maier & Neustadt, P.C.

(57) ABSTRACT

A method for displaying simulated 3D space as an image includes the steps presenting a different image to each eye of a viewer by use of a 3D image display apparatus having an image display section, and using a convex lens to present as a real image within reach of the viewer's hands a 3D image produced from the images displayed at the image display section by parallax between the eyes. A device is provided for carrying out the method.

8 Claims, 6 Drawing Sheets

METHOD AND DEVICE FOR DISPLAYING SIMULATED 3D SPACE AS AN IMAGE

BACKGROUND OF THE INVENTION

1. Field of the Invention

This invention relates to a method and device for displaying simulated 3D space as an image.

2. Description of the Prior Art

Ordinary 3D displays have adopted the presentation of parallax. 3D image display devices employ either a viewer-worn display or a stationary display. The most common viewer-worn display is the head-mounted display (HMD). While this display can impart a 3D perception including distance and does not restrict the activity domain of the image viewer, it puts a severe physical burden on the viewer such as by producing feelings of heaviness confinement and causing eye fatigue. The display is therefore difficult to use for long periods. Production of high-resolution images with a viewer-worn display is, moreover, difficult using currently available technology.

A stationary display puts less burden on the viewer than one worn by the viewer. However, devices using this type of display have been incapable of synthesizing images that the viewer perceives as three-dimensional when the display is distant from the viewer's eyes (beyond the fusion limit). This is because human 3D perception depends both on binocular parallax at short distances and on focus information (in the approximate range of 0–3 meters from the eyes).

Although this problem can be overcome by putting the stationary display near the viewer, this method restricts the viewer's range of movement and makes viewer interaction with the 3D image impossible. When using a stationary 3D display for teleoperation or as a simulator for training, therefore, the only option available has been to project the 3D image to a place apart from the viewer. This has made it impossible to convey a strong perception of realism to the viewer. As a concrete example, FIGS. 6(a) and 6(b) show a viewer 23 attempting to teleoperate jobs performed by a robot 21 in a workspace 22 in front of the robot 21. In order to secure a certain amount of open space (elbowroom) 26 for the viewer 23, the display 24 has to be positioned at a location apart from the viewer 23. Moreover, owing to the fusion limit, the projected workspace 25 displayed on the display 24 must be formed at a position apart from the viewer 23. The viewer 23 therefore does not experience sufficient realism and has difficulty in carrying out operations accurately.

The fusion limit will be briefly explained. In a 3D display method using parallax, a discrepancy arises between the depth estimated from the thickness of the eye lenses responsible for adjusting focus and the depth calculated from parallax. When, as shown in FIG. 7, parallax images 35a and 35b are presented to a viewer 32 situated apart from the display 31, the depth of the images estimated from parallax is perceived to be at the line-of-sight intersection point 37. Moreover, since the image for the right eye 35a passes through the lens 33a of the right eye and is focused on the retina 34a of the right eye and the image for the left eye 35b passes through the lens 33b of the left eye and is focused on the retina 34b of the left eye, the depth of the images estimated from the thickness of the eye lenses is perceived to be at a position 36 midway between the images 35a and 35b. This gives the viewer a feeling of unnaturalness. As human depth perception uses focus information in preference to parallax information when viewing nearby objects, this feeling becomes particularly strong if the viewer is forced to make stereoscopic observations at short range. Moreover, when a real object 38 such as the viewer's hand comes into the field of vision as shown in FIG. 8, the viewer experiences a very strong impression of mismatch that arises because the parallax of the presented image and the parallax of the hand arise at approximately the same location but the viewer cannot focus on two points at the same time.

To overcome the foregoing problems, it is necessary to provide a 3D display fulfilling the following three requirements.

i) To reduce the physical burden on the viewer by using a stationary display to present images.

ii) To enable short-range 3D perception without giving the viewer a feeling of unnaturalness.

iii) To provide open space sufficient for the viewer to interact with the 3D image.

An object of this invention is to meet these requirements by providing a method and device for displaying simulated 3D space as an image that does not place a physical burden on the viewer even during long-term use, that does not give the viewer a feeling of unnaturalness even regarding short-range 3D perception, and that offers enough open space for the viewer to interact with the 3D image.

SUMMARY OF THE INVENTION

For achieving these objects the invention provides a device for displaying simulated 3D space as an image comprising:

an image display apparatus having an image display section for presenting a different image to each eye of a viewer, and a convex lens for presenting as a real image within reach of the viewer's hands a 3D image produced from the images displayed at the image display section by parallax between the eyes.

The invention further provides a method for displaying simulated 3D space as an image comprising:

presenting a different image to each eye of a viewer by use of a 3D image display apparatus having an image display section, and using a convex lens to present as a real image within reach of the viewer's hands a 3D image produced from the images displayed at the image display section by parallax between the eyes.

Thus, by positioning a convex lens in front of the image displaying surface of an image display apparatus capable of presenting each eye with a different image, the invention presents a 3D image as a real image within reach of the viewer's hands. As the image is therefore formed at a position substantially matching the position estimated from parallax between the left and right eyes on condition that the image is presented within the operation space (within reach of the viewer's hands), it conveys strong realism with no feeling of unnaturalness.

The above and other features of the present invention will become apparent from the following description made with reference to the drawings.

BRIEF EXPLANATION OF THE DRAWINGS

FIG. 5 is a conceptual view of teleoperation using a workspace created according to the invention, in which

FIG. 6 is a conceptual view of the conventional method of teleoperation using a stationary display, in which

DESCRIPTION OF THE PREFERRED EMBODIMENT

Figure 1:
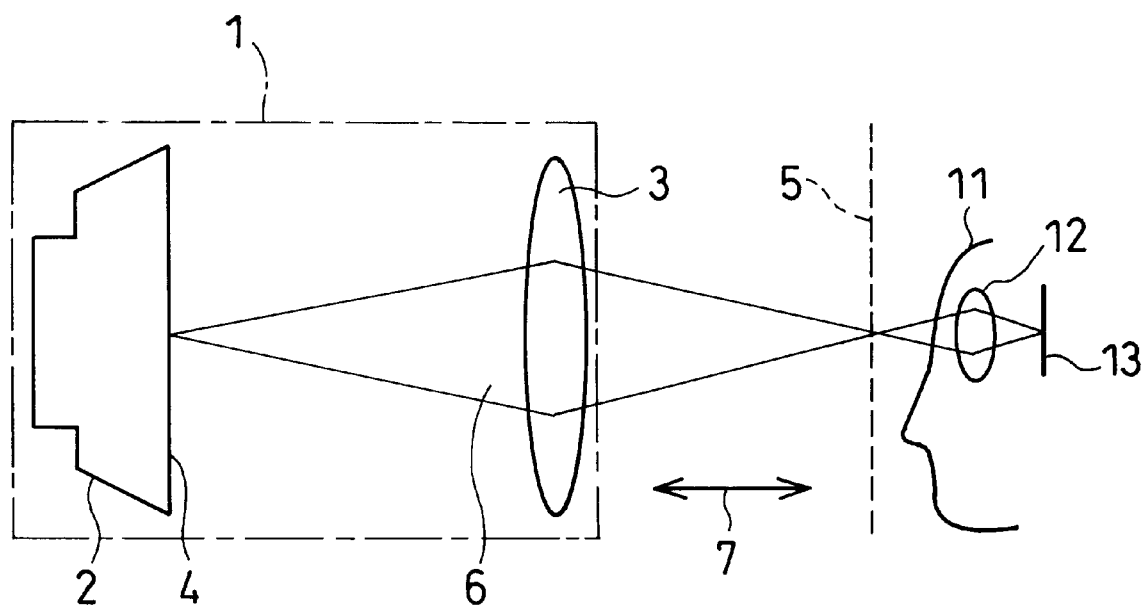
FIG. 1 is a diagram for explaining the basic principle of image display according to the invention.

FIG. 1 is a diagram for showing the basic principle used by the invention to display simulated 3D space. An image display device 1 comprises an image display apparatus 2 capable of displaying two different images, one for each eye, on an image display plane 4 and a convex lens 3 disposed to face the image display plane 4 of the image display apparatus 2. The convex lens 3 is situated to leave a certain amount of open space 7 for the viewer 11 and the real image of the image display apparatus 2 is formed on the optical axis of the convex lens 3 and this is defined as the image display plane 4.

As the image display apparatus 2 capable of offering the aforesaid parallax, there can be adopted any of various conventional devices such as a large CRT, projection display or plasma display.

The convex lens 3 of the inventors' experimental device measured 35 inches in diameter and had a focal length of 30 inches. The size of the convex lens 3 can, however, be appropriately selected in consideration of the size of the image to be presented. A Fresnel lens is preferably adopted when especially large images are to be presented. As Fresnel lenses are generally finished on only one side, however, two Fresnel lenses are arranged in tandem in order to obtain an image with low distortion.

In the experimental device, the distance between the image display plane 4 and the convex lens 3 was set between around 1 and 2 meters so that the rays entering the lens would be closer to parallel. The distance can be set shorter when a lens with short focal length is used.

The viewable range of the image (angle of visibility) can be expanded by using a Fresnel lens with a smaller focal length or a Fresnel lens with a larger diameter.

Figure 5A:
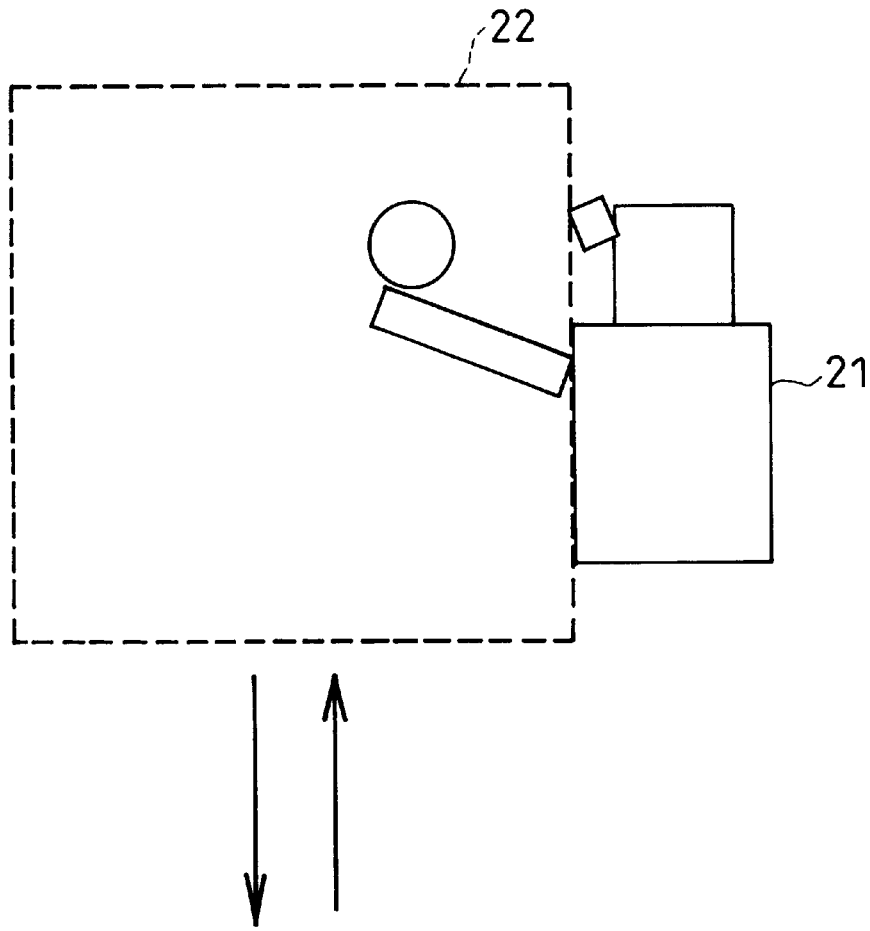
FIG. 5(a) is an explanatory view of the workspace of a robot and FIG. 5(b) is an explanatory view of a workspace presented to the viewer.
Figure 5B:
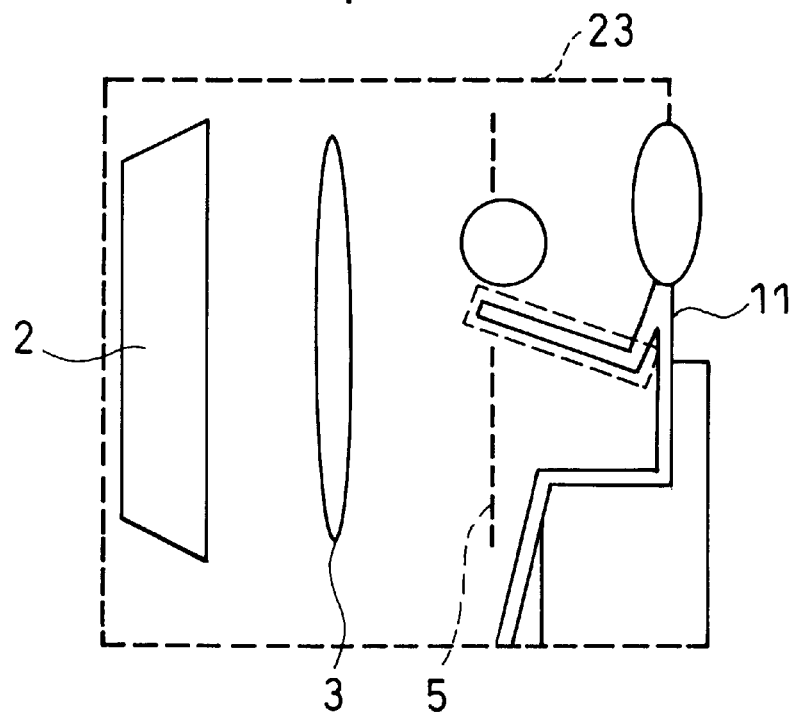
Figure 6A:
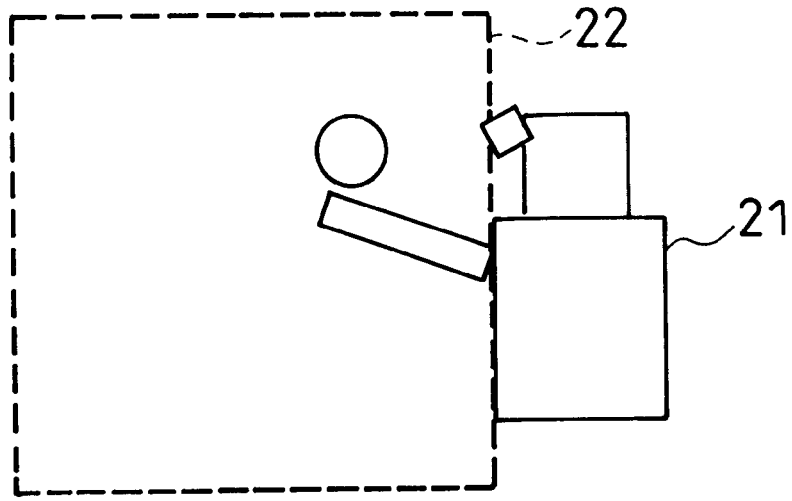
FIG. 6(a) is an explanatory view of the workspace of a robot and FIG. 6(b) is an explanatory view of a workspace presented to the viewer.
Figure 6A:
Figure 6B:
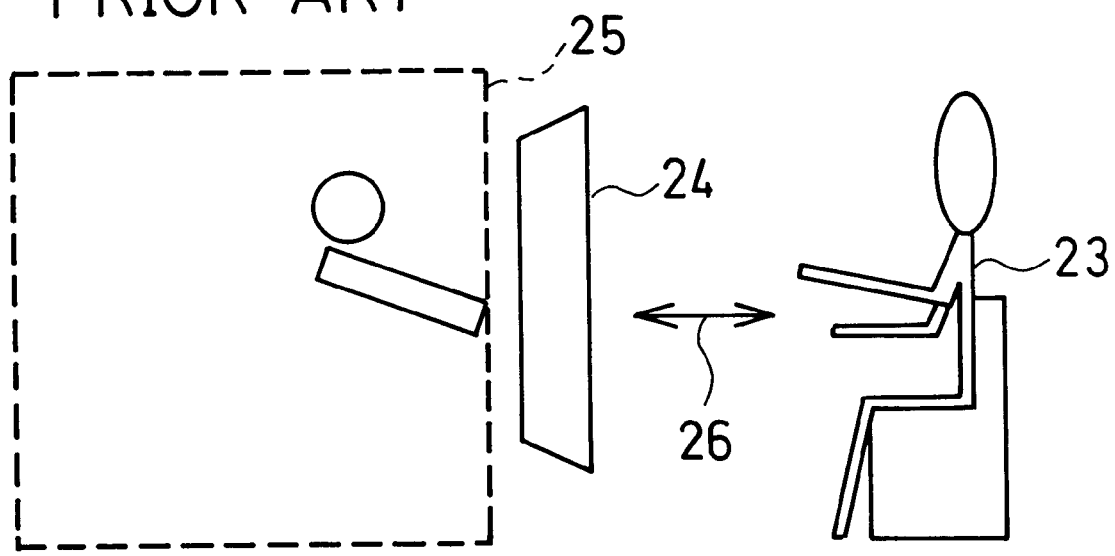
Figure 7:
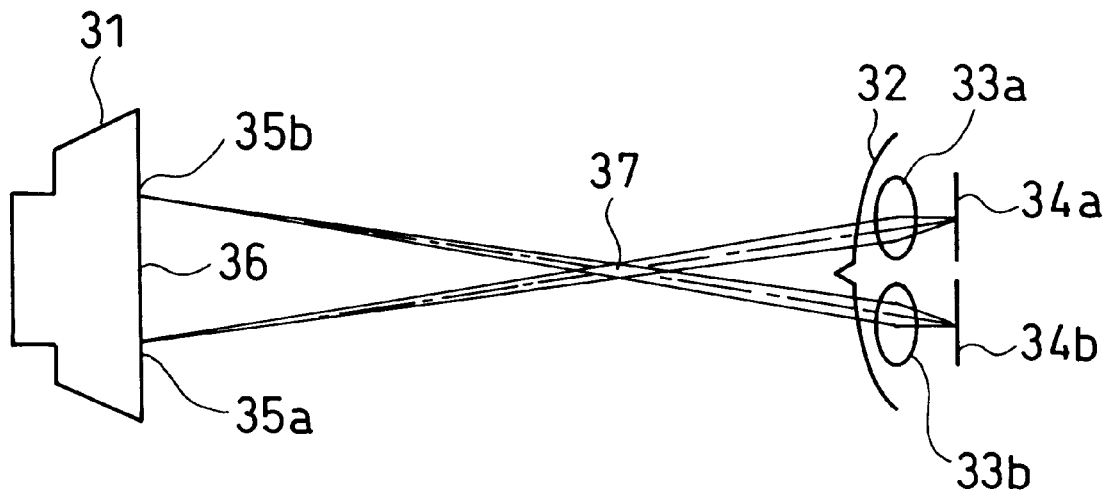
FIG. 7 is a diagram for explaining the arrangement of a conventional parallax-type 3D display.
Figure 8:
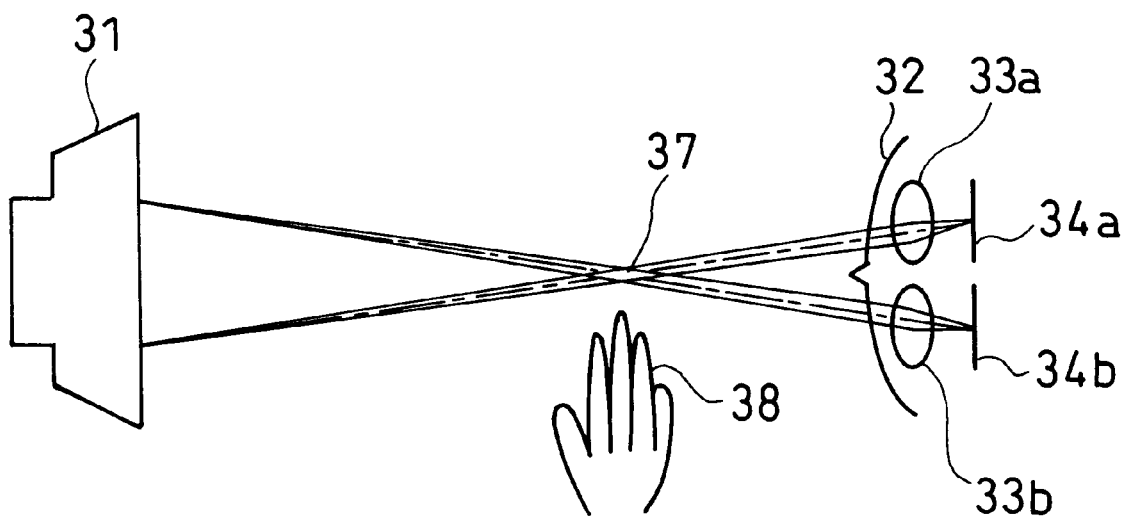
FIG. 8 is diagram for explaining a phenomenon that occurs when a real object comes into the field of view at a time when a 3D image is being observed with a conventional parallax-type 3D display.

Under the foregoing conditions, owing to the positioning of the image display apparatus 2 and the convex lens 3 in front of the viewer 11, the image of the image display plane 4 of the image display apparatus a 2 appears, as shown in FIG. 5B at a real image display plane 5 formed immediately in front of the viewer 11, i.e., within reach of the viewer's hands, with the open space 7 still maintained, and then passes through the lenses 12 of the users eyes to form images on the viewer's retinas 13.

When a convex lens with a focal length 30 inches is used, the real image is formed 15 inches ahead. The viewer assumes a position 20 inches from the real image. A distance of about 35 inches (the open space) is therefore maintained between the viewer and the lens, enough to ensure that the viewer's hands do not touch the lens even when full extended. At the same time, the real image is situated approximately midway of the viewer's reach, so that the difference between depth perceived from the parallax of the 3D image in the workspace and the depth perceived from accommodation (focusing) can be kept small on condition that the image is presented within the operation space.

Figure 2A:
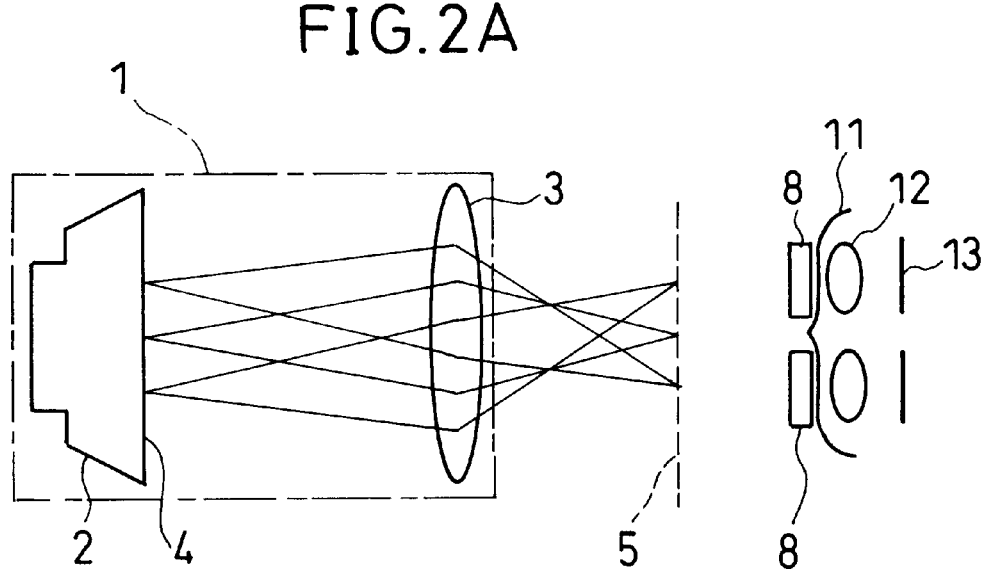
FIG. 2(a) is a schematic diagram showing an embodiment of the image display device according to the invention.

As shown in FIG. 2(a), the image display device 1 composed of the image display apparatus 2 and the convex lens 3 shown in FIG. 1 is combined with a 3D image presenting device 8. The 3D image presenting device 8 can, for example, be a parallax presenting device such as stereoscopic glasses, an image splitter or a lenticular plate, or be a depth presenting device such as a variable focal point solid lens (or display arrays disposed at different distances). As a result, a 3D image appears on the real image display plane 5 a short distance in front of the viewer 11.

Figure 2B:
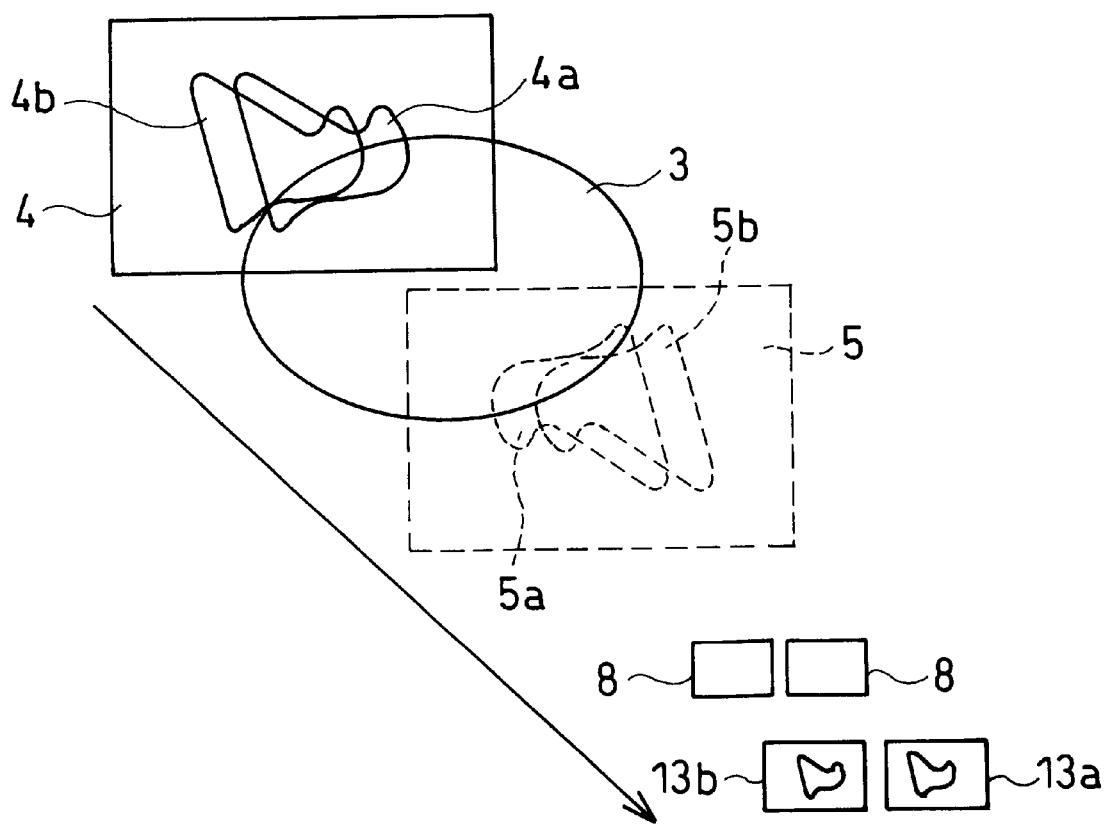
FIG. 2(b) is a diagram for explaining formation of a 3D image by the device of FIG. 2(a).

Therefore, as shown in FIG. 2(b), double images 4a, 4b separable by filters 8, 8 serving as the 3D image presenting device are displayed at the image display plane 4. The convex lens 3 displays the double images 4a, 4b displayed here on the real image display plane 5 formed immediately in front of the viewer as double real images 5a, 5b. When the double real images 5a, 5b are viewed through the filters 8, 8, the right eye 13a and the left eye 13b are presented with different images. Thus, a parallax image whose parallax is calculated on the assumption that it is on the surface where real images are formed is projected to the right eye and the left eye, respectively. By this, a parallax image with a near focusing point can be presented without limiting the open space available for viewer movement. As the real image is therefore formed at position substantially matching the position estimated from parallax between the left and right eyes on condition that the image is presented within the operation space, it conveys strong realism with no feeling of unnaturalness.

Presentation of filter-separable double images can be by time-sharing display or polarizing display. In the case of time-sharing display, the image display plane is scanned at a scan rate of 120 Hz, the image for the right eye and the image for the left eye are displayed alternately, and shutters in the filter section of stereoscopic glasses are open and closed synchronously with the scan rate of the image display section to display different images to the left and right eyes. In the case of polarizing display, a vertical polarized image and a horizontally polarized image are displayed as the double images. The filter section of the stereoscopic glasses is provided on one side with a vertically polarized lens and on the other with a horizontally polarized lens so as to display different images to the right and left eyes.

When a binocular parallax display device is used in place of stereoscopic glasses, there is used an image display device configured to make light advance with directional selectivity. The image from the image display plane of this device passes through the convex lens to present in front of the viewer a real image whose light advances with directional selectivity. By this, a parallax image with a near focusing point can be presented without limiting the open space available for viewer movement.

Figure 3:
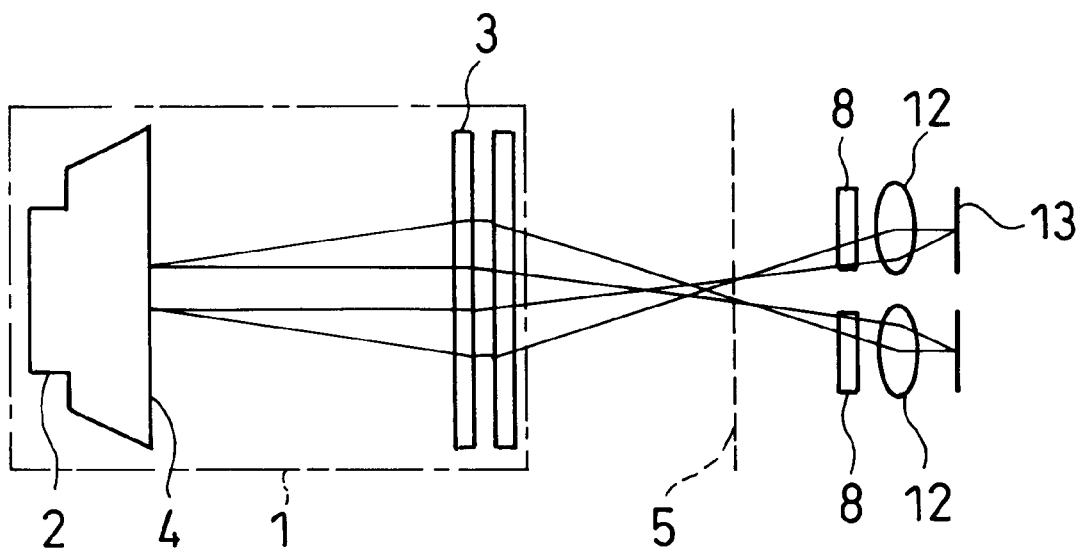
FIG. 3 is a diagram showing the relationship between parallax and focus when an image is presented at a position near the viewer using the device of FIG. 2.

An image display device 1 using a large Fresnel lens as the convex lens 3 can be combined with a 3D image presentation device 8 using stereoscopic glasses, an image splitter or a lenticular plate. The resulting device can present parallax whereby the lenses 12 of the viewer's focus at a near point. In this case, as shown in FIG. 3, even if a 3D image of an object is presented near the viewer 11, no large difference arises between the depth estimated from parallax information and the depth estimated from focus information. It thus becomes possible to present a near 3D image with no unnaturalness. In teleoperation such as discussed below with reference to FIG. 5 or in work simulation by VR (virtual reality), therefore, the viewer can be presented in his or her immediate vicinity with a 3D image made free of unnaturalness by minimizing the discrepancy between focus and parallax.

Figure 4:
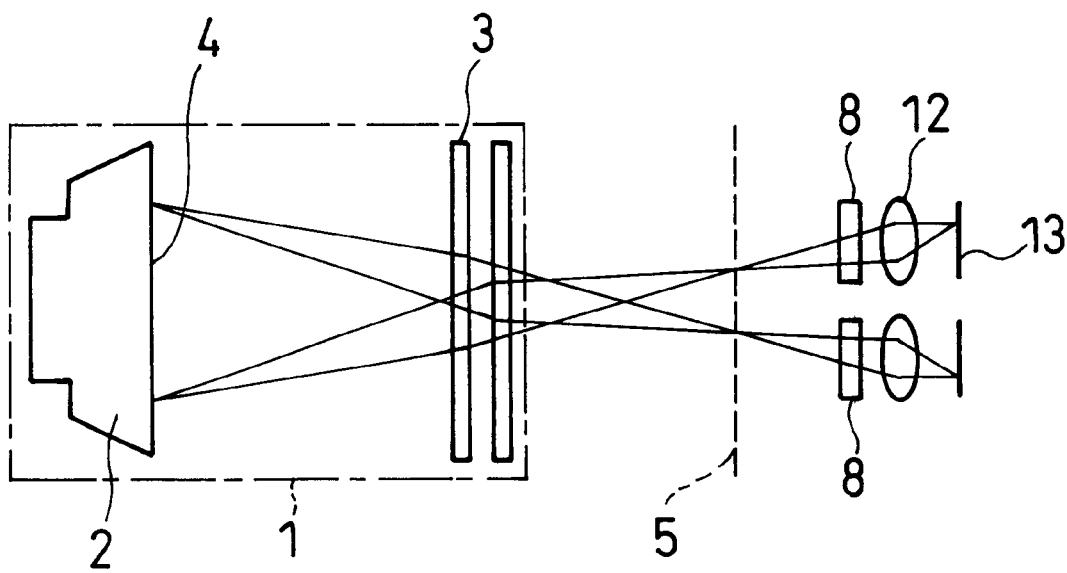
FIG. 4 is a diagram showing the relationship between parallax and focus when an image is presented at a position far from the viewer using the device of FIG. 2.

If an optical device is incorporated that causes the lenses 12 of the viewer's eyes to focus at a near point, then, as shown in FIG. 4, the depth information from parallax and the depth information from focus will differ greatly with respect to a distant 3D image.

When a distant 3D image is actually presented with this device, however, the unnaturalness experienced by the viewer is smaller than when a close 3D image is presented from a distant display by parallax.

Thus, in this device, the viewer can perceive distant 3D images without feeling unnaturalness even though the discrepancy between the depth information from parallax and the depth information from focus is great. The reason for this will be explained.

First and foremost is the fact that at long distances human perception relies mainly on parallax. Therefore, once an object is perceived by parallax as being far away, information supplied by focus tends to be neglected. Moreover, the relationship of (Depth perception by parallax)<(Depth perception by focus)

that arises when the image plane is distant never arises in daily life, but the relationship of (Depth perception by parallax)>(Depth perception by focus)

is frequently experienced, such as when viewing a distant scene through a window while remaining conscious of the intervening glass. This is believed to be why viewers do not perceive any particular unnaturalness or disagreeable feeling.

FIGS. 5(a) and 5(a) show an example in which a viewer 11 attempts to teleoperate jobs performed by a robot 21 in a workspace 22 in front of the robot 21. As the workspace 23 is projected on the real image display plane 5 in front of the viewer 11, as shown in FIG. 5(b), it can be presented to give the viewer the impression of touching and manipulating objects in the image with his or her own hands, without any feeling of unnaturalness. Thus, even when at a remote location, the viewer has the virtual experience of performing jobs and can efficiently carry out tasks in a highly realistic ambience without experiencing more than an ordinary degree of fatigue.

As explained in the foregoing, this invention enables creation of a 3D environment in close proximity to the viewer. By use of the invention display device, the viewer can be given the impression of manipulating objects in an image displayed by a stationary display without imparting any unnatural feeling. As the device therefore enables the viewer to interact with the image as though becoming a part of it, it provides an effective human interface for teleoperation devices. For the same reason, it can also be expected to be utilized with considerable effect in various other applications, including, for example, use as an effective human interface in training simulators utilizing virtual reality.

Obviously, numerous modifications and variations of the present invention are possible in light of the above teachings. It is therefore to be understood that within the scope of the appended claims, the invention may be practiced otherwise than as specifically described herein.

What is claimed is:

1. A device configured to display simulated 3D space as an image comprising:

an image display apparatus having an image display section configured to present a different image to each eye of a viewer; and a convex lens having a single focus, located between the image display apparatus and the viewer, configured to converge, within reach of the viewer's hands, light diverged at the image display section showing the two images with parallax on a plane between the convex lens and the viewer, wherein the convex lens is disposed so the light diverged at the image display section converges within reach of the viewer's hands without the viewer having to rotate the image display apparatus.

2. A device according to claim 1, wherein the convex lens is disposed relative to the viewer to leave open space for viewer movement.

3. A device according to claim 1, wherein the convex lens is a Fresnel lens.

4. The device according to claim 1, wherein the convex lens is configured as two Fresnel lenses arranged in tandem order.

5. A method for displaying simulated 3D space as an image comprising:

presenting a different image to each eye of a viewer by use of a 3D image display apparatus having an image display section; and using a convex lens having a single focus, located between the image display apparatus and the viewer, configured to converge, within reach of the viewer's hands, light diverged at the image display section showing the two images with parallax on a plane between the convex lens and the viewer, wherein the convex lens is disposed so the light diverged at the image display section converges within reach of the viewer's hands without the viewer having to rotate the image display apparatus.

6. A device for displaying simulated 3D space as an image comprising:

means for presenting a different image to each eye of a viewer; and means for converging having a single focus, within reach of the viewer's hands, light diverged at the means for presenting the different image showing the two images with parallax on a plane between the means for converging and the viewer, wherein the means for converging is disposed so the light diverged at the means for presenting converges within reach of the viewer's hands without the viewer having to rotate the means for presenting.

7. The device according to claim 6, wherein the means for converging is disposed relative to the viewer to leave open space for viewer movement.

8. The device according to claim 6, wherein the means for converging includes two Fresnel lenses arranged in tandem order.

* * * * *

UNITED STATES PATENT AND TRADEMARK OFFICE
CERTIFICATE OF CORRECTION

PATENT NO.     : 6,614,426 B1                                              Page 1 of 1
DATED          : September 2, 2003
INVENTOR(S)    : Kakeya It is certified that error appears in the above-identified patent and that said Letters Patent is hereby corrected as shown below:

<u>Title page,</u>
Item [45], should read
-- [45] **Date of Patent: *Sep. 2, 2003** --.
Item [*] Notice, should read
-- [*] Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days. --

Signed and Sealed this

Twenty-ninth Day of June, 2004

JON W. DUDAS
*Acting Director of the United States Patent and Trademark Office*